United States Patent
Song (10) Patent No.: US 11,588,204 B2
(45) Date of Patent: Feb. 21, 2023

(54) VENTING DEVICE AND BATTERY PACK ASSEMBLY INCLUDING SAME, AND VEHICLE INCLUDING THE BATTERY PACK ASSEMBLY

(71) Applicant: LG ENERGY SOLUTION, LTD., Seoul (KR)

(72) Inventor: Hyeon-Jin Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 45 days.

(21) Appl. No.: 17/393,761

(22) Filed: Aug. 4, 2021

(65) Prior Publication Data
US 2022/0131230 A1 Apr. 28, 2022

(30) Foreign Application Priority Data
Jul. 14, 2020 (KR) .................. 10-2020-0086933

(51) Int. Cl.
*H01M 50/30* (2021.01)
*H01M 50/317* (2021.01)
(Continued)

(52) U.S. Cl.
CPC ....... *H01M 50/317* (2021.01); *H01M 10/425* (2013.01); *H01M 10/48* (2013.01); *H01M 50/204* (2021.01); *H01M 50/249* (2021.01); *H01M 2200/20* (2013.01); *H01M 2220/20* (2013.01)

(58) Field of Classification Search
CPC ............. H01M 50/317; H01M 50/325; H01M 50/333; H01M 50/249; H01M 50/204; H01M 10/425; H01M 10/48; H01M 10/482; H01M 2200/20; H01M 2220/20
See application file for complete search history.

(56) References Cited

U.S. PATENT DOCUMENTS

| 2010/0047673 A1 | 2/2010 | Hirakawa et al. |
| 2013/0052497 A1 | 2/2013 | Noh et al. |
| (Continued) | | |

FOREIGN PATENT DOCUMENTS

| CN | 209592164 U | 11/2019 | |
| DE | 4342653 | * 6/1994 | ............... B60H 1/24 |
| (Continued) | | | |

*Primary Examiner* — Raymond Alejandro
(74) *Attorney, Agent, or Firm* — Birch, Stewart, Kolasch & Birch, LLP (57) ABSTRACT

A venting device is provided at one side of a battery pack to discharge a venting gas generated in an inner space of the battery pack to the outside. The venting device includes a cylinder block configured to communicate with the inside of the battery pack and a venting gas flow path for discharging the venting gas to the outside, a piston assembly configured to move upward along an extension direction of the cylinder block by receiving a force caused by the increase of the internal pressure of the battery pack so that the inner space of the battery pack communicates with the venting gas flow path and a magnet unit installed in the cylinder block and configured to restrict upward movement of the piston assembly by a magnetic force so that the communication between the venting gas flow path and the inner space of the battery pack is blocked.

16 Claims, 5 Drawing Sheets

(51) Int. Cl.
   *H01M 50/249*   (2021.01)
   *H01M 50/204*   (2021.01)
   *H01M 10/42*    (2006.01)
   *H01M 10/48*    (2006.01)

(56) References Cited

U.S. PATENT DOCUMENTS

| | | | |
|---|---|---|---|
| 2019/0221802 A1* | 7/2019 | Maguire | B60L 50/64 |
| 2019/0267593 A1 | 8/2019 | Do et al. | |
| 2019/0386273 A1* | 12/2019 | Pflueger | H01M 50/291 |
| 2020/0251707 A1 | 8/2020 | Han et al. | |
| 2020/0295329 A1* | 9/2020 | Mack | H01M 50/30 |
| 2020/0303700 A1 | 9/2020 | Park et al. | |
| 2021/0025514 A1 | 1/2021 | Magel et al. | |

FOREIGN PATENT DOCUMENTS

| | | |
|---|---|---|
| EP | 2 797 158 A1 | 10/2014 |
| JP | 2008-117756 A | 5/2008 |
| JP | 2020-529570 A | 10/2020 |
| KR | 10-2013-0023621 A | 3/2013 |
| KR | 10-2016-0032843 A | 3/2016 |
| KR | 10-2017-0025700 A | 3/2017 |
| KR | 10-2019-0007710 A | 1/2019 |
| KR | 10-2019-0023648 A | 3/2019 |
| KR | 10-2198047 B1 | 1/2021 |
| KR | 10-2262432 B1 | 6/2021 |
| WO | WO 2013/118166 A1 | 8/2013 |

\* cited by examiner

VENTING DEVICE AND BATTERY PACK ASSEMBLY INCLUDING SAME, AND VEHICLE INCLUDING THE BATTERY PACK ASSEMBLY

TECHNICAL FIELD

The present disclosure relates to a venting device, a battery pack assembly including the venting device, and a vehicle including the battery pack assembly. More specifically, the present disclosure relates to a venting device that reversibly operates for quickly discharging a gas that causes an internal pressure to rise to the outside when the pressure inside a battery pack rises above a reference pressure and also keeping the battery pack in a sealed state again after the pressure is equalized according to the gas discharge, a battery pack assembly including the venting device, and a vehicle including the battery pack assembly.

The present application claims priority to Korean Patent Application No. 10-2020-0086933 filed on Jul. 14, 2020 in the Republic of Korea, the disclosures of which are incorporated herein by reference.

BACKGROUND ART

When venting of a battery cell occurs inside a battery pack due to overcharging, an internal short circuit caused by failure, or the like, the pressure inside the battery pack suddenly rises. Since the battery pack is generally manufactured to maintain a sealed state, if the internal pressure rises abnormally high as above, there is a risk of deformation and damage of the battery pack.

In order to prevent the internal pressure of a battery pack from rising above a certain level, an element for lowering the internal pressure of the battery pack to the level of atmospheric pressure by being opened when the internal pressure exceeds a certain level, such as a burst disc or a gore vent, is sometime applied to the battery pack itself. However, such venting elements are just disposable elements that cannot be used again once venting is performed.

Therefore, if such devices are applied, the corresponding device must be replaced even when the device is opened due to an internal pressure rise caused by other causes than venting according to an abnormality in the battery cells inside the battery pack, which makes it impossible that the device is used repeatedly.

In addition, if such devices are applied, it is not possible to accurately figure out whether an abnormality occurs at the battery cells inside the battery pack, and therefore, it is difficult to accurately determine whether or not to stop using the battery pack.

DISCLOSURE

Technical Problem

The present disclosure is designed to solve the problems of the related art, and therefore the present disclosure is directed to providing a venting device that reversibly operates for quickly discharging a gas that causes an internal pressure to rise to the outside when the pressure inside a battery pack rises above a reference pressure and also keeping the battery pack in a sealed state again after the pressure is equalized according to the gas discharge.

In addition, the present disclosure is also directed to making it possible to know whether the cause of an increase in internal pressure of the battery pack is due to the generation of gas caused by venting of the battery cell, so that it may be figured out whether to continue or stop the use of the battery pack.

In addition, if venting by the venting device is not smoothly performed despite the increase of the internal pressure of the battery pack, the present disclosure is also directed to evaluating that the venting device has a failure or the battery pack has a problem in sealing, and allowing a user to know this situation and take a quick action.

However, the technical object to be solved by the present disclosure is not limited to the above, and other objects not mentioned herein will be clearly understood by those skilled in the art from the following disclosure.

Technical Solution

In one aspect of the present disclosure, there is provided a venting device, which is provided at one side of a battery pack to discharge a venting gas generated in an inner space of the battery pack to the outside, the venting device comprising: a cylinder block configured to communicate with the inside of the battery pack and having a venting gas flow path for discharging the venting gas to the outside; a piston configured to move upward along an extension direction of the cylinder block by receiving a force caused by an increase of an internal pressure of the battery pack so that the inner space of the battery pack communicates with the venting gas flow path; and a magnet installed in the cylinder block and configured to restrict upward movement of the piston by a magnetic force so that the communication between the venting gas flow path and the inner space of the battery pack is blocked.

The venting device may further comprise a first sensor installed in an inner space of the cylinder block to detect a pressure in the battery pack; and a second sensor installed at an upper end of the cylinder block to detect a pressure caused by upward movement of the piston assembly.

The venting device may further comprise an electromagnetic coil configured to surround a part of the piston.

The venting device may further comprise a switch configured to be connected between the battery pack and the electromagnetic coil; and a controller configured to output a switching-on signal to electrically connect the battery pack and the electromagnetic coil by the switch when the second sensor detects upward movement of the piston assembly and the pressure in the battery pack sensed by the first sensor is lower than a preset reference pressure.

The electromagnetic coil may generate an electromagnetic force according to the switching-on signal of the controller so that the piston moves downward to block the communication between the venting gas flow path and the inner space of the battery pack.

The controller may be configured to output a failure detection signal for the venting device or a bad sealing detection signal for the battery pack when upward movement of the piston is not detected by the second sensor and a pressure equal to or higher than the preset reference pressure is detected by the first sensor.

The first sensor may include a pressure sensor configured to sense the pressure in the battery pack; and a gas detection sensor configured to detect the venting gas in the battery pack.

The controller may be configured to output a venting detection signal for the inside of the battery pack when the first sensor detects that the pressure in the battery pack is equal to or higher than the preset reference pressure, the venting gas inside the battery pack is detected, and the second sensor detects that the venting gas flow path is opened according to upward movement of the piston assembly.

In another aspect of the present disclosure, there is also provided a battery pack assembly, comprising: a battery pack; and the venting device according to an embodiment of the present disclosure, which is provided at one side of the battery pack.

In another aspect of the present disclosure, there is also provided a vehicle, comprising the battery pack assembly according to an embodiment of the present disclosure.

Advantageous Effects

According to an embodiment of the present disclosure, when the pressure inside the battery pack rises above a reference pressure, the gas that causes the internal pressure rise is quickly discharged to the outside, and also after the pressure is equalized according to the discharge of the gas, the battery pack may keep a sealed state again.

In addition, according to another embodiment of the present disclosure, it is possible to know whether the cause of the increase of the internal pressure of the battery pack is due to the generation of gas caused by venting of the battery cell, so that the user may figure out whether to continue or stop the use of the battery pack.

According to still another embodiment of the present disclosure, if venting by the venting device is not smoothly performed despite the increase of the internal pressure of the battery pack, it is evaluated that the venting device has a failure or the battery pack has a problem in sealing, so that a user knows this situation and takes a quick action.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
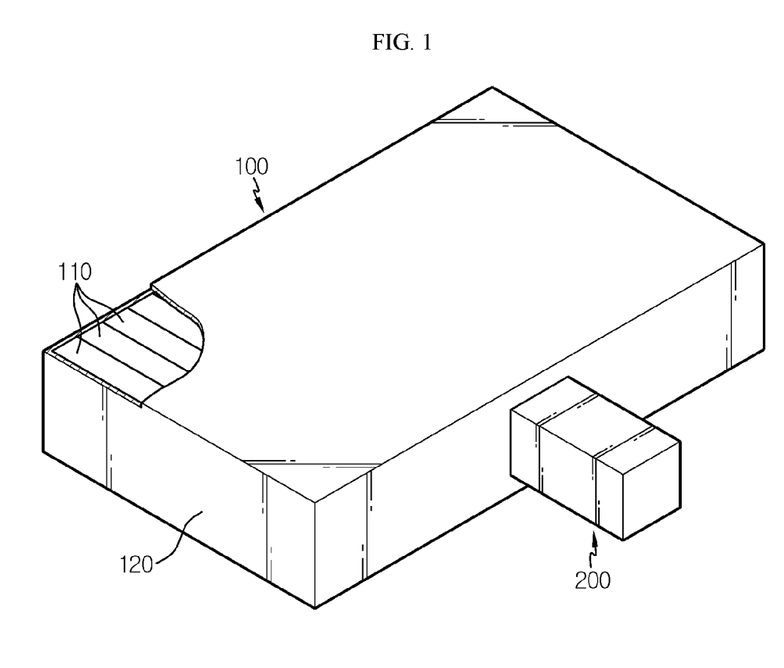
FIG. 1 is a diagram showing a battery pack according to an embodiment of the present disclosure.

Referring to FIG. 1, a battery pack assembly according to an embodiment of the present disclosure includes a battery pack 100 and a venting device 200 according to an embodiment of the present disclosure provided at one side of the battery pack 100.

The battery pack 100 includes a plurality of battery cells 110 and a pack housing 120 for accommodating the plurality of battery cells 110. The plurality of battery cells 110 are electrically connected to form one cell stack, and the cell stack may be accommodated in the pack housing 120 as it is without a separate housing, or may be provided to be form accommodated in a module housing. If the cell stack is accommodated in the module housing to form a battery module, a module group formed by electrically connecting a plurality of battery modules to each other may be accommodated in the pack housing 120.

The venting device 200 is provided at one side of the battery pack 100 to discharge a venting gas generated in an inner space of the battery pack 100 to the outside. The venting gas may be generated due to overcharging of the battery cell 110 located inside the battery pack 100 or an internal short circuit caused by component damage.

Figure 2:
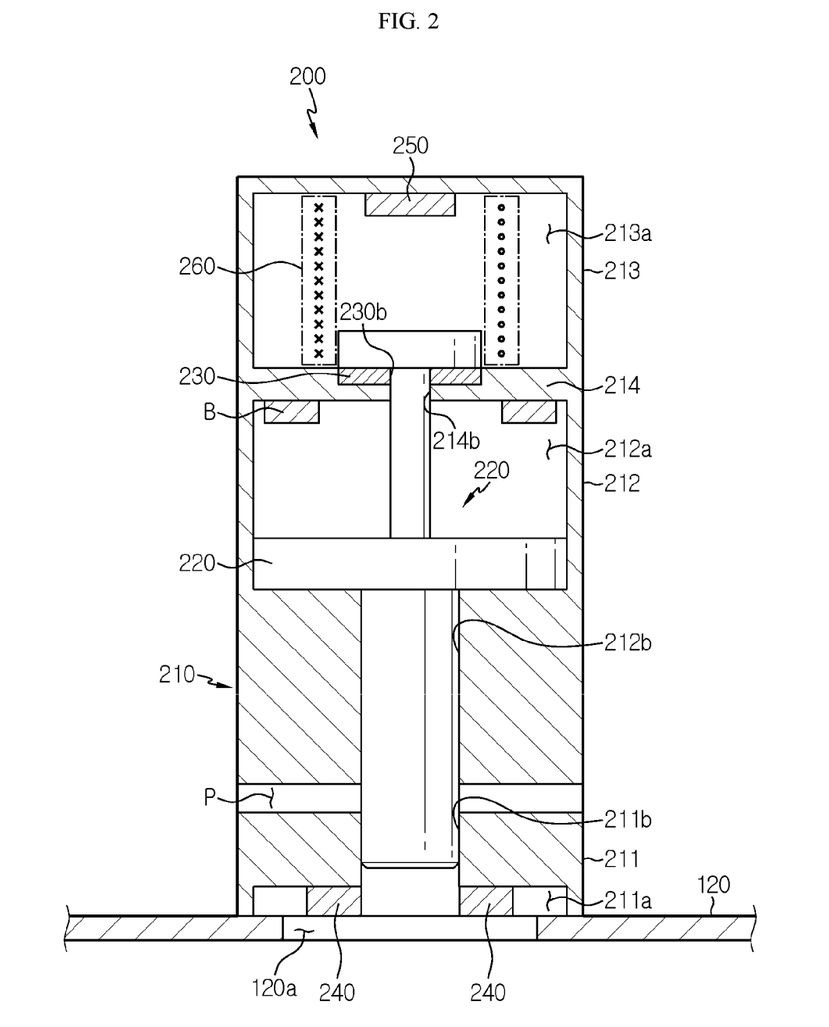
FIG. 2 is a diagram showing an internal structure of a venting device according to an embodiment of the present disclosure in a state where a piston assembly does not move upward due to venting.
Figure 3:
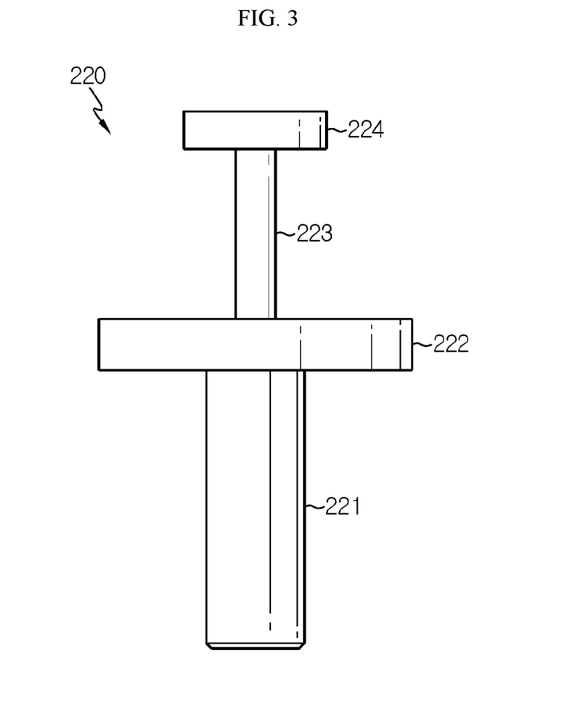
FIG. 3 is a diagram showing the piston assembly applied to the present disclosure.
Figure 4:
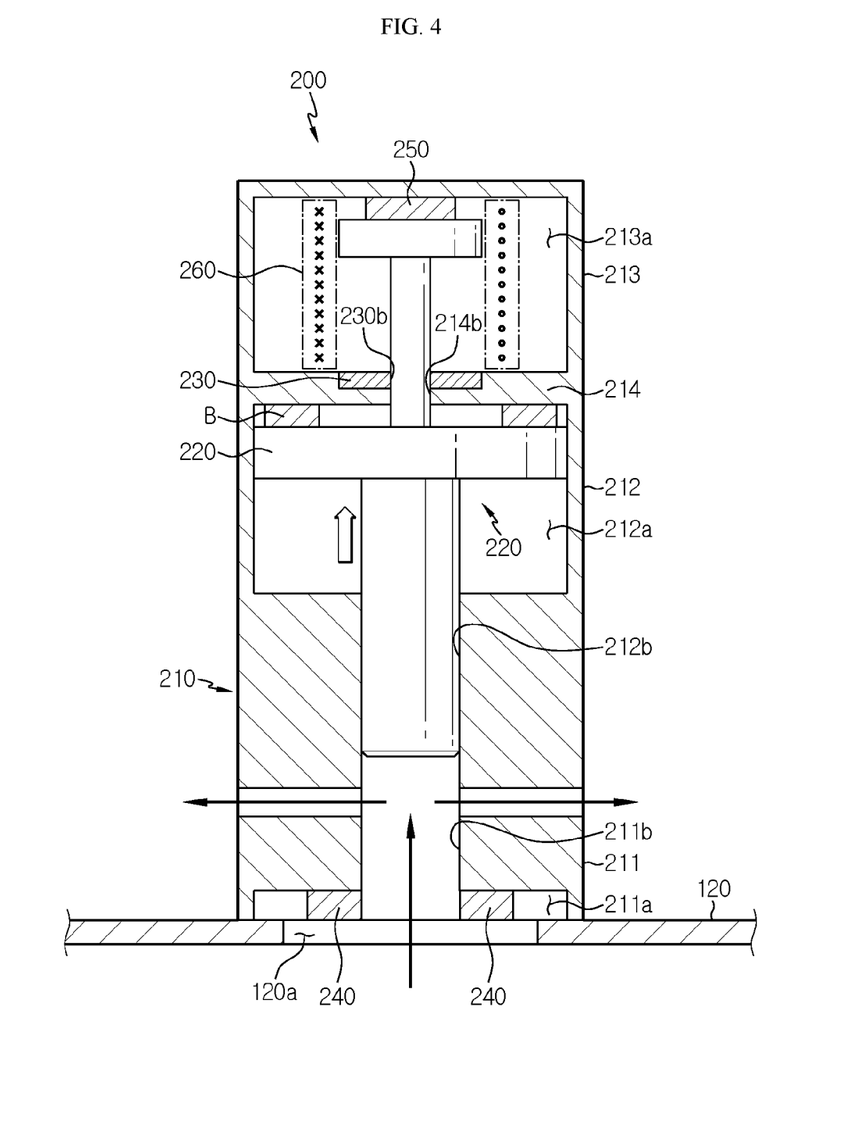
FIG. 4 is a diagram showing an internal structure of the venting device according to an embodiment of the present disclosure in a state where the piston assembly moves upward due to venting.

Referring to FIGS. 2 to 4, the venting device 200 according to an embodiment of the present disclosure includes a cylinder block 210, a piston assembly 220 and a magnet unit 230.

The cylinder block 210 has a venting gas flow path P that communicates with the inside of the battery pack 100 and discharges the venting gas to the outside. The venting gas flow path P may be provided to penetrate a side surface of the cylinder block 210. A lower end of the cylinder block 210 is coupled to the pack housing 120. More specifically, the lower end of the cylinder block 210 is coupled to the pack housing 120 to cover a pack hole 120a formed through the pack housing 120.

The cylinder block 210 includes a first block 211 located at a lowermost side, a second block 212 located on the first block 211, a third block 213 located on the second block 212, and a fourth block 214 located between the second block 212 and the third block 213. The first block 211, the second block 212, the third block 213 and the fourth block 214 may be integrally formed. Alternatively, at least some of the first block 211, the second block 212, the third block 213 and the fourth block 214 may be provided as separate parts to be coupled to each other.

The first block 211 has a first space 211a that communicates with the inner space of the pack housing 120 through the pack hole 120a. The first block 211 has a first shaft guide hole 211b above the first space 211a. The first shaft guide hole 211b is formed to extend along an upper and lower direction to provide a space into which a part of the piston assembly 220 is inserted. The inner diameter of the first shaft guide hole 211b may be formed smaller than the width of the first space 211a. The first shaft guide hole 211b guides upward and downward movement of the piston assembly 220.

The second block 212 is located above the first block 211, and the venting gas flow path P communicating with the first space 211a and the first shaft guide hole 211b is provided between the first block 211 and the second block 212. The venting gas flow path P communicates with the first shaft guide hole 211b and the first space 211a if the lower end of the piston assembly 220 leaves the first shaft guide hole 211b and moves upward further due to the upward movement of the piston assembly 220.

The second block 212 has a second shaft guide hole 212b provided above the venting gas flow path P. The inner diameter of the second shaft guide hole 212b may be approximately the same as the inner diameter of the first shaft guide hole 211b. The second shaft guide hole 212b is formed to extend along the upper and lower direction to provide a space into which a part of the piston assembly 220 is inserted. The second shaft guide hole 212b guides upward and downward movement of the piston assembly 220. The second block 212 includes a second space 212a formed above the second shaft guide hole 212b. The width of the second space 212a may be formed larger than the inner diameter of the second shaft guide hole 212b. A part of the piston assembly 220 is accommodated in the second space 212a.

The third block 213 has a third space 213a therein. The fourth block 214 partitions the second space 212a of the second block 212 and the third space 213a of the third block 213 from each other. That is, the fourth block 214 forms the ceiling of the second space 212a and also forms the bottom of the third space 213a. The fourth block 214 has a third shaft guide hole 214b. The third shaft guide hole 214b guides upward and downward movement of the piston assembly 220. The inner diameter of the third shaft guide hole 214b may be smaller than the width of the second space 212a. In addition, the inner diameter of the third shaft guide hole 214b may be formed smaller than the width of the third space 213a.

An upper portion of the piston assembly 220 is accommodated in the third space 213a, and the upper portion of the piston assembly 220 located in the third space 213a moves between a lower end and an upper end of the third space 213a according to the upward and downward movement of the piston assembly 220.

Meanwhile, in this specification, the cylinder block 210 is explained as four separated blocks, but the four blocks just have different names according to their positions along the extension direction (the upper and lower direction in FIGS. 2 to 3) of the cylinder block 210, and as described above, the four blocks constituting the cylinder block 210 may be integrally formed. Alternatively, at least some of the four blocks constituting the cylinder block 210 may be provided as individual parts and may be coupled to each other.

The piston assembly 220 moves upward along the extension direction of the cylinder block 210 by receiving the force caused by the increase of the internal pressure of the battery pack 100 so that the inner space of the battery pack 100 communicates with the venting gas flow path P. The piston assembly 220 includes a first shaft 221 located at a lowermost side, a first piston block 222 connected to an upper end of the first shaft 221, a second shaft 223 connected to an upper portion of the first piston block 222 to extend upward, and a second piston block 224 connected to an upper end of the second shaft 223.

The first shaft 221 is inserted into the first shaft guide hole 211b of the first block 211 and the second shaft guide hole 212b of the second block 212, and its upward and downward movement is guided by the first shaft guide hole 211b and the second shaft guide hole 212b. A lower portion of the first shaft 221 leaves the first shaft guide hole 211b according to the upward movement of the piston assembly 220 so that the venting gas flow path P communicates with the first space 211a through the first shaft guide hole 211b.

The first piston block 222 is connected to the upper end of the first shaft 221 and is located in the second space 212a of the second block 212. The first piston block 222 may have a larger diameter than the first shaft 221. The first piston block 222 is guided to move upward and downward by an inner wall surface of the second space 212a. The first piston block 222 moves between the lower end and the upper end of the second space 212a, and moves upward according to the increase of the internal pressure of the battery pack 100. In order to prevent the first piston block 222 from strongly colliding with the lower surface of the fourth block 214 while the first piston block 222 moves upward due to the increase of the internal pressure of the battery pack 100, a buffering member B such as a spring may be provided at the lower surface of the fourth block 214.

The second shaft 223 is connected to the upper portion of the first piston block 222 and extends upward. The second shaft 223 may have a smaller diameter than the first piston block 222. The second shaft 223 is inserted into the third shaft guide hole 214b, and its upward and downward movement is guided by the third shaft guide hole 214b.

The second piston block 224 is connected to the upper end of the second shaft 223 and is located in the third space 213a of the third block 213. The second piston block 224 may have a larger diameter than the second shaft 223. The second piston block 224 moves between the lower end and the upper end of the third space 213a, and moves upward as the internal pressure of the battery pack 100 increases.

The magnet unit 230 is installed in the cylinder block 210 and restricts the upward movement of the piston assembly 220 by a magnetic force, thereby maintaining that the communication between the venting gas flow path P and the inner space of the battery pack 100 is blocked. In order to realize this function of the magnet unit 230, the magnet unit 230 includes a permanent magnet having a magnetic force within a certain range in consideration of the increase level of the internal pressure of the battery pack 100 due to venting. The magnet unit 230 may be fixed on, for example, the upper surface of the fourth block 214, namely on the lower surface of the third space 213a. In this case, the magnet unit 230 may have a perforated hole 230b corresponding to the third shaft guide hole 214b so that the second shaft 223 passes therethrough. Accordingly, the lower surface of the second piston block 224 connected to the upper end of the second shaft 223 passing through the third shaft guide hole 214b and the perforated hole 230b may be coupled to the upper surface of the magnet unit 230 by the magnetic force of the magnet unit 230. For the magnetic coupling of the magnet unit 230, the second piston block 224 includes a metal that may be attached to a magnet, in its entirety or at least its lower part.

Meanwhile, referring to FIGS. 2 to 4, the venting device 200 according to an embodiment of the present disclosure may further include a first sensing unit 240 and a second sensing unit 250. In addition, the venting device 200 according to an embodiment of the present disclosure may further include an electromagnetic coil 260 that operates according to the sensing results of the first sensing unit 240 and the second sensing unit 250.

The first sensing unit 240 is installed in the inner space of the cylinder block 210 to detect the pressure inside the battery pack 100. To realize this function, the first sensing unit 240 may include a pressure sensor. The first sensing unit 240 is disposed in the first space 211a of the first block 211 and detects the increase of pressure caused by the generation of a venting gas inside the battery pack 100, and provides the sensed pressure value to a controller 280, explained later.

The second sensing unit 250 is installed at an upper end of the cylinder block 210. The second sensing unit 250 detects a pressure generated as the piston assembly 220 moves upward and comes into contact with the sensing unit 250. The second sensing unit 250 comes into contact with the second piston block 224 of the piston assembly 220 when the piston assembly 220 moves upward as the internal pressure of the battery pack 100 increases. The second sensing unit 250 detects the pressure generated accordingly, and provides the sensed pressure value to the controller 280, explained later. The fact that the pressure is detected by the second sensing unit 250 means that the venting gas flow path P is opened to communicate with the inner space of the battery pack 100 according to the upward movement of the piston assembly 220.

The electromagnetic coil 260 is located in the third space 213a of the third block 213. The electromagnetic coil 260 surrounds a part of the piston assembly 220. More specifically, the electromagnetic coil 260 has a coiled shape to surround the entire second piston block 224 of the piston assembly 220, or the entire second piston block 224 and a part of the second shaft 223. The electromagnetic coil 260 applies an electromagnetic force to the second piston block 224, which has moved to the upper end of the third space 213a as the internal pressure of the battery pack 100 increases, so that the second piston block 224 moves downward and is coupled to the magnet unit 230.

The electromagnetic coil 260 is electrically connected to the battery pack 100 when the upward movement of the piston assembly 220 is detected by the second sensing unit 250 and the pressure inside the battery pack 100 sensed by the first sensing unit 240 is lower than a preset reference pressure. The electromagnetic coil 260 electrically connected in this way generates an electromagnetic force to downwardly move the second piston block 224 located inside the electromagnetic coil 260. In a case where the magnetic force by the magnet unit 230 is not applied to the second piston block 224 as the second piston block 224 moves upward farther away from the magnet unit 230, the electromagnetic coil 260 may ensure that the second piston block 224 reliably performs its returning operation.

Figure 5:
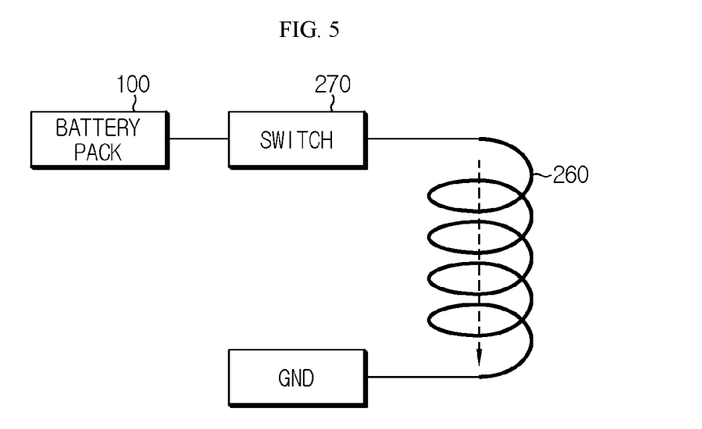
FIG. 5 is a diagram for illustrating the connection relationship of an electromagnetic coil, a switch and a battery pack according to the present disclosure.
Figure 6:
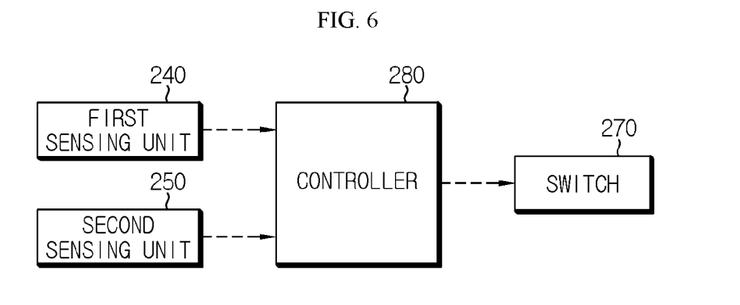
FIG. 6 is a diagram for illustrating the relationship of a first sensing unit, a second sensing unit, a switch and a controller according to the present disclosure.

Meanwhile, referring to FIGS. 5 and 6 along with FIGS. 2 to 4, the venting device 200 according to an embodiment of the present disclosure may further include a switch 270 and a controller 280 such that the electromagnetic coil 260 may be operated with reference to the sensing results by the first sensing unit 240 and the second sensing unit 250 as described above.

The switch 270 is connected between the battery pack 100 and the electromagnetic coil 260. The switch 270 may be connected between, for example, a positive electrode terminal of the battery pack 100 and one end of the electromagnetic coil 260, and the other end of the electromagnetic coil 260 may be grounded. Also, the controller 280 determines whether or not to output a switching-on signal with reference to the sensing values of the first sensing unit 240 and the second sensing unit 250. As described above, the controller 280 outputs a switching-on signal when the upward movement of the piston assembly 220 is sensed by the second sensing unit 250 and the pressure inside the battery pack 100 sensed by the first sensing unit 240 is lower than the preset reference pressure. As the switching-on signal is output, the electromagnetic coil 260 is electrically connected, and an electromagnetic force is generated from the top to the bottom according to the coiling direction, so that the second piston block 224 located inside the electromagnetic coil 260 moves downward. As the second piston block 224 moves downward and is coupled with the magnet unit 230, the communication between the venting gas flow path P and the first space 211a is blocked by the first shaft 221.

Figure 7:
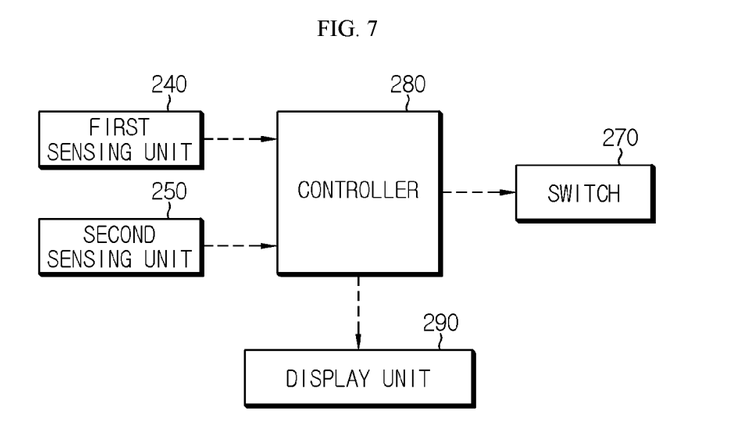
FIG. 7 is a diagram for illustrating the relationship of the first sensing unit, the second sensing unit, the switch, the controller and a display unit according to the present disclosure.

Referring to FIG. 7 along with FIGS. 2 to 5, the venting device 200 according to an embodiment of the present disclosure may further include a display unit 290 that displays the state of the battery pack 100 according to the sensing results of the first sensing unit 240 and the second sensing unit 250.

In this case, if the upward movement of the piston assembly 220 is not detected by the second sensing unit 250 even though the first sensing unit 240 detects a pressure equal to or higher than the preset reference pressure, the controller 280 outputs a failure detection signal for the venting device 200 or a bad sealing detection signal for the batter pack 100. The display unit 290 enables the user to know that a failure occurs at the venting device 200 or a sealing failure occurs at the battery pack 100 by means of a visual and/or audible notification according to these detection signals output from the controller 280.

Meanwhile, the first sensing unit 240 may further include a gas detection sensor capable of detecting a venting gas leaking from the battery cell 110 and present in the battery pack 100, in addition to the pressure sensor. In this case, the controller 280 outputs a venting detection signal for the inside of the battery pack 100 if the first sensing unit 240 detects that the pressure inside the battery pack 100 is equal to or higher than the preset reference pressure, the generation of venting gas inside the battery pack 100 is detected, and the second sensing unit 250 detects that the venting gas flow path P is opened according to the upward movement of the piston assembly 220. The display unit 290 allows the user to know that venting occurs inside the battery pack 100 by means of a visual and/or audible notification according to the detection signals output from the controller 280.

As described above, the battery pack assembly according to an embodiment of the present disclosure includes the venting device 200 that operates in response to an increase of the internal pressure caused by venting in the battery pack 100 or other reasons, thereby eliminate thing risk of ignition and/or explosion caused by the increase of the internal pressure. In addition, according to the present disclosure, the battery pack 100 and the venting device 200 may be repeatedly used by applying a structure in which the venting gas flow path P, which is opened according to an increase in internal pressure, can be closed again using an electromagnetic force.

Meanwhile, a vehicle according to an embodiment of the present disclosure includes the battery pack assembly according to an embodiment of the present disclosure as described above. The vehicle operates by receiving a power by the battery pack 100 provided in the battery pack assembly of the present disclosure. The safety of the vehicle in use is greatly improved by the venting device 200 of the present disclosure provided in the battery pack assembly.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A venting device, which is provided at one side of a battery pack to discharge a venting gas generated in an inner space of the battery pack to the outside, the venting device comprising:
   a cylinder block configured to communicate with the inside of the battery pack and having a venting gas flow path for discharging the venting gas to the outside;
   a piston configured to move upward along an extension direction of the cylinder block by receiving a force caused by an increase of an internal pressure of the battery pack so that the inner space of the battery pack communicates with the venting gas flow path; and
   a magnet installed in the cylinder block and configured to restrict upward movement of the piston by a magnetic force so that the communication between the venting gas flow path and the inner space of the battery pack is blocked.

2. The venting device according to claim 1, further comprising:
   a first sensor installed in an inner space of the cylinder block to detect a pressure in the battery pack; and
   a second sensor installed at an upper end of the cylinder block to detect a pressure caused by upward movement of the piston.

3. The venting device according to claim 2, further comprising:
   an electromagnetic coil configured to surround a part of the piston.

4. The venting device according to claim 3, further comprising:
   a switch configured to be connected between the battery pack and the electromagnetic coil; and
   a controller configured to output a switching-on signal to electrically connect the battery pack and the electromagnetic coil by the switch when the second sensor detects upward movement of the piston assembly and the pressure in the battery pack sensed by the first sensor is lower than a preset reference pressure.

5. The venting device according to claim 4, wherein the electromagnetic coil generates an electromagnetic force according to the switching-on signal of the controller so that the piston moves downward to block the communication between the venting gas flow path and the inner space of the battery pack.

6. The venting device according to claim 5, wherein the controller is configured to output a failure detection signal for the venting device or a bad sealing detection signal for the battery pack when upward movement of the piston assembly is not detected by the second sensor and a pressure equal to or higher than the preset reference pressure is detected by the first sensor.

7. The venting device according to claim 5, wherein the first sensor includes:
   a pressure sensor configured to sense the pressure in the battery pack; and
   a gas detection sensor configured to detect the venting gas in the battery pack.

8. The venting device according to claim 7, wherein the controller is configured to output a venting detection signal for the inside of the battery pack when the first sensor detects that the pressure in the battery pack is equal to or higher than the preset reference pressure, the venting gas inside the battery pack is detected, and the second sensor detects that the venting gas flow path is opened according to upward movement of the piston assembly.

9. A battery pack assembly, comprising:
   a battery pack; and
   the venting device according to claim 1, which is provided at one side of the battery pack.

10. A vehicle, comprising the battery pack assembly according to claim 9.

11. The venting device according to claim 1, wherein the cylinder block has a first chamber, and
    wherein the magnet is on a bottom surface of the first chamber.

12. The venting device according to claim 11, further comprising:
    an electromagnetic coil in the first chamber, the electromagnetic coil surrounding the piston.

13. The venting device according to claim 1, wherein the cylinder block has a first shaft guide hole extending in the extension direction of the cylinder block and a first chamber;
    wherein the piston has a shaft extending inside the first shaft guide hole and a piston block in the first chamber, and
    wherein the venting gas flow path extends laterally from the first space.

14. The venting device according to claim 13, wherein the magnet is on a bottom surface of the first chamber.

15. The venting device according to claim 14, further comprising:
    an electromagnetic coil in the first chamber, the electromagnetic coil surrounding the piston block.

16. The venting device according to claim 1, wherein the cylinder block comprises:
    a first shaft guide hole extending in the extension direction of the cylinder block;
    a first chamber above the first shaft guide hole;
    a second shaft guide hole extending from the first chamber in the extension direction of the cylinder block; and
    a second chamber above the second shaft guide hole, and
    wherein the piston comprises:
    a first shaft extending inside the first shaft guide hole;
    a first piston block in the first chamber;
    a second shaft extending inside the second shaft guide hole; and
    a second piston block in the second chamber.

* * * * *